United States Patent [19]
Maier

[11] 3,716,580
[45] Feb. 13, 1973

[54] FUNCTIONAL TERTIARY PHOSPHINE OXIDES

[75] Inventor: Ludwig Maier, Kilchberg/Zurich, Switzerland

[73] Assignee: Monsanto Company, St. Louis, Mo.

[22] Filed: Dec. 3, 1970

[21] Appl. No.: 94,965

Related U.S. Application Data

[63] Continuation-in-part of Ser. No. 883,291, Dec. 8, 1969, abandoned.

[30] Foreign Application Priority Data

Dec. 17, 1968 Switzerland..................19115/68
Aug. 28, 1969 Switzerland..................13191/69
Dec. 11, 1969 Switzerland..................18556/69

[52] U.S. Cl..........................260/488 J, 260/606.5 P
[51] Int. Cl................................................C07f 9/02
[58] Field of Search..............260/606.5 P, 488 J, 403

[56] References Cited

UNITED STATES PATENTS 3,404,187  10/1968  Kober et al.....................260/606.5 P
3,477,953  11/1969  Carlson..........................260/606.5 P

*Primary Examiner*—Daniel E. Wyman
*Assistant Examiner*—Werten F. W. Bellamy
*Attorney*—Neal E. Willis, J. E. Maurer and Edward P. Grattan

[57] ABSTRACT

Tertiary phosphine oxides of the formula

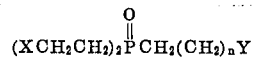

in which X is selected from the group consisting of hydroxyl, chlorine, bromine or an RO, RS or RC(O)O— group, wherein R is a hydrocarbon group, Y signifies hydroxyl, chlorine or bromine if $n$ is O, or Y is defined as X if $n$ is 1, and $n$ is 0 or 1, and a novel process for preparing such phosphine oxides. Tertiary phosphine oxides, exemplified by tris-(2-hydroxyethyl)-phosphine oxide, bis-(2-chloroethyl)-chloromethylphosphine oxide and bis-(2-decanoxyethyl)-chloromethylphosphine oxide are useful as flameproofing agents and plasticizers.

13 Claims, No Drawings

FUNCTIONAL TERTIARY PHOSPHINE OXIDES

This application is a continuation in part of co-pending application Ser. No. 883,291, filed Dec. 8, 1969, and now abandoned.

This invention relates to new and useful functional tertiary phosphine oxides and to their preparation.

The functional tertiary phosphine oxides of the present invention have the formula $$(XCH_2CH_2)_3\overset{O}{\underset{\|}{P}}CH_2(CH_2)_nY$$

in which X signifies a hydroxyl group, a chlorine atom, a bromine atom, RO—, RS— or RC(O)O—, where R is a hydrocarbon group derived from a monohydric alcohol, phenol or mercaptan, Y signifies hydroxyl, chlorine or bromine if $n$ is 0, or it is defined as X is $n$ is 1, and $n$ has a value of 0 or 1.

The compound corresponding to the above formula wherein X and Y signify hydroxyl groups and $n$ has a value of 0, i.e., the bis-(2-hydroxyethyl)-hydroxymethylphosphine oxide, is obtained by treating an aqueous solution of the quaternary phosphonium chloride of the formula $$[(HOCH_2CH_2)_3PCH_2OH]c?Cl^-$$

with at least a stoichiometric amount of an alkali at a temperature of from about 15° to 50°C. The isolation of the bis-(2-hydroxyethyl)-hydroxymethylphosphine oxide formed can be achieved by evaporating the water and extracting the product with, e.g., ethyl alcohol.

A second and preferred method of preparing bis-(2-hydroxyethyl)-hydroxymethylphosphine oxide comprises treating an aqueous solution of the above-mentioned quaternary phosphonium chloride at a temperature of from about 15° to 50°C. with at least a stoichiometric amount of chlorine, while maintaining a pH of about 1. The isolation can be carried out as indicated in the first method.

Another compound corresponding to the above formula wherein X and Y represent hydroxyl groups and n has a value of 1, i.e. the hitherto unknown tris-(2-hydroxyethyl)-phosphine oxide, is obtained by treating an aqueous solution of the above-mentioned quaternary phosphonium chloride with chlorine at a temperature of from about 15° to 50°C., while keeping the pH in the range of about 3 to 6 by addition of a base, e.g., caustic soda solution. Under these conditions only the hydroxymethyl group is split off. The reaction is expediently carried out at room temperature. The isolation again can be performed as indicated in the first method. If the acid solution is to be evaporated it may be convenient to neutralize it in order to avoid evolution of HCl.

The preparation of the starting tris-(2-hydroxyethyl)-phosphonium chloride is well known. Upon treating this starting quaternary phosphonium chloride with aqueous potassium iodide-iodine solution it has been theorized that there should be formed the tris-(2-hydroxyethyl)-phosphine oxide with cleavage of formaldehyde and hydrogen (W.J. Vullo, I and EC Product Res. and Development 5, 346, 1966). However, since not a pure starting compound but the mixture resulting from the preparation was used, that statement which is only based on the detection of formaldehyde cannot be accepted without more.

It has surprisingly been found that on treating the starting phosphonium chloride with an aqueous solution of potassium iodide and iodine according to the literature or with an alkali according to the first method explained above, no cleavage of formaldehyde occurs and consequently not tris-(2-hydroxyethyl)-phosphine oxide, but bis-(2-hydroxyethyl)-hydroxymethylphosphine oxide is formed, which has not been previously known. Treatment with at least a stoichiometric amount of aqueous sodium hydroxide or potassium hydroxide has been found to be especially expedient.

It has been well known that by the action of caustic soda solution on tetrakis-(hydroxymethyl)-phosphonium chloride, there is formed the functional tertiary tris-(hydroxymethyl)-phosphine oxide with cleavage of formaldehyde and hydrogen (M. Grayson, JACS 85, 79, 1963). Therefore it was unexpected that the hydroxymethyl group is maintained in the instant case.

The bis-(2-chloroethyl)-chloromethylphosphine oxide and tris-(2-chloroethyl)-phosphine oxide of the bromine derivative, respectively, corresponding to the formula set forth above, wherein X and Y signify chlorine atoms and $n$ stands for 0 or 1, are obtained by substituting chlorine atoms for hydroxyl groups in the hydroxylated precursory products. The substitution of chlorine or bromine atoms for hydroxyl groups by means of simultaneous halogenating and dehydrating agents, such as $PCl_5$, $PBr_5$ and the like, is well known in the art.

A further method being especially suited for the preparation of the bromo derivatives resides in the cleavage of ester groups with hydrogen halides. Upon heating of, e.g., bis-(2-acetoxyethyl)-chloromethylphosphine oxide or tris-(2-acetoxyethyl)-phosphine oxide in an inert solvent, e.g., nitrobenzene, at elevated temperatures, e.g., 130°C., and passing in hydrogen halide, e.g., HBr, the corresponding bis-(2-bromoethyl)-chloromethylphosphine oxide or tris-(2-bromoethyl)-phosphine oxide, respectively, is obtained.

A further class of useful compounds conforming to the formula set forth at the beginning, wherein X and Y are groups RO— or RS— and $n$ has a value of 1, is obtained upon replacing the chlorine atoms of tris-(2-haloethyl)-phosphine oxide by reacting it with an alcohol, phenol or mercaptan in the form of an alkali salt or in the presence of a tertiary amine, using well established methods, however at temperatures not higher than about 100°C. Any ordinary alcohol, phenol or mercaptan is suitable and it is also well known that these can contain substituents inert to the reaction such as halogen, tertiary amino groups, e.g., dimethylamino, diallylamino, diodecylamino, dicyclohexylamino, diphenylamino, pyrrolino, piperidino, morpholino, N-trimethylsilylpiperazino and decahydroquinolino; ether groups (RO—), e.g., methoxy, 2-propenoxy, n-octoxy, stearoxy, phenoxy, m-allylphenoxy, and 3-biphenylyloxy; corresponding mercapto groups (RS—); ester groups

, e.g., acetoxy, crotonyloxy, capryloxy, cumoyloxy, phenylacetoxy and benzoxy; or ester groups

e.g., carbomethoxy, carboiso-propenoxy, carboctadecoxy and carbophenoxy; acyl groups

e.g., acetyl, benzoyl.

A still further class of useful functional tertiary phosphine oxides corresponding to the formula, wherein X is an RO— or RS— group and n is zero, is prepared by exchanging halogen atoms of bis-(2-haloethyl)-chloromethylphosphine oxide as explained above, but at temperatures not higher than about 50°C. It has been found that in such reaction with, e.g., sodium ethanolate in ether, even using a stoichiometric ratio of 1:3, only the chlorine atoms of the chloroethyl groups are exchanged under these conditions, so that, e.g., bis-(2-ethoxyethyl)-chloromethylphosphine oxide is formed. The same is true of other alkali alcoholates and alkali mercaptides, or with an alcohol, phenol of mercaptan itself if the reaction is carried out in the presence of a tertiary amine, e.g., triethylamine.

Still a further class of useful compounds obeying to the formula set forth above, wherein X and Y signify RC(O)O— groups are obtained by replacing the hydrogen atoms of the hydroxyl groups of bis-(2-hydroxyethyl)-hydroxymethylphosphine oxide or tris-(2-hydroxyethyl)-phosphine oxide by reacting with an acid chlorine, e.g., acetyl chloride, lauroyl chloride and benzoyl chloride, using common methods.

The chlorinated and brominated phosphine oxides are suitable flameproofing agents for combustible materials. For example, they can be added to the spinning dopes to be extruded, or to textile materials formed therefrom such as polyacrylics, polyesters, polyurethanes, polyamides, polyhydryocarbons, cellulose, cellulose derivatives and the like. Owing to their property of slowly releasing ethylene, the chlorinated phosphine oxides are valuable agents for the subsequent ripening of certain fruits. They are used for this purpose in a similar manner to the well known 2-chloroethylphosphonic acid. As compared to this well known compound, the herein disclosed compounds have the advantage of releasing a greater amount of ethylene per mole and the ethylene evolution occurs somewhat easier, since they have two to three chloroethyl groups.

Moreover, tris-(2-haloethyl)-phosphine oxide and bis-(2-chloroethyl)-chloromethylphosphine oxide are valuable intermediates. It has already been shown above that the chlorine atoms of the chloroethyl groups can easily be replaced. It has already been disclosed in my co-pending U. S. application Ser. No. 690,418, filed Dec. 14, 1967, that the chlorine atom of the chloromethyl group linked to a phosphorus atom can be exchanged for groups such as —P(OR)$_2$, —P(R)(OR) and —PR$_2$ by reacting with a corresponding phosphorus acid triester, phosphonous acid diester or phosphinous acid ester. It has now also been found that the chlorine atom of the chloroethyl groups attached to a phosphorous atom can be exchanged in the same manner and analogous very useful products are obtained.

Furthermore, it has already been disclosed in my co-pending Swiss Patent applications 13,191/69, filed Aug. 28, 1969, and 15,143/69, filed Oct. 8, 1969, that cleavage of HCl from the chloroethyl group can be effected by heating the compound in toluene in the presence of at least a stoichiometric amount of triethylamine. The trivinylphosphine oxide or divinylchloromethylphosphine oxide are very useful products, since they are polymerizable using well established methods for the polymerization of vinyl compounds.

The hydroxylated phosphine oxides of the invention are also useful in flameproofing of combustible materials. They possess a greater thermal stability when compared to the previously known tris-(hydroxymethyl)-phosphine oxide, in that they do not release toxic formaldehyde upon heating to the temperature at which tris-(hydroxymethyl)-phosphine oxide releases formaldehyde. Likewise upon stronger heating and comparing at the same higher temperature no easily volatile and very toxic phosphine ($PH_3$) is formed. Moreover, the present compounds display better solubility in many organic solvents and have higher boiling points.

The liquid tris-(2-hydroxyethyl)-phosphine oxide and bis-(2-hydroxyethyl)-hydroxymethylphosphine oxides are also suited for use as plasticizers. They can be used instead of well known plasticizers which latter may be replaced totally or partially. Common methods are applicable for their incorporation into polymers. These compounds also are valuable intermediates. The hydrogen atom of the hydroxyl group is exchangeable in the same manner as that of ordinary alcoholic or phenolic hydroxyls. Upon reaction with carboxylic acid chlorides employing the usual methods, the corresponding ester derivatives are formed.

The ether derivatives and thioether derivatives such as tris-(2-ethoxyethyl)-phosphine oxide, tris-(2-ethylthioethyl)-phosphine oxide, bis-(2-ethoxyethyl)-chloromethyl phosphine oxide, bis-(2-ethylthioethyl)-chloromethylphosphine oxide and the like are also suitable as plasticizers since they are liquid at low temperatures. Similar derivatives showing one to three long straight-chain alkyl groups having eight to 20 carbon atoms, such as tris-(2-dodecyloxyethyl)-phosphine oxide and bis-(2-tetradecylthioethyl)-chloromethylphosphine oxide display surfactant properties and are utilizable as additives to dry cleaning solvents. The phosphine oxides showing three inert ether or thioether groups are also used as functional fluids, hydraulic fluids, heat exchange fluids and lubricants. Analogs containing halogenated and/or nitrated arylether groups such as bis-(2-p-chlorophenoxyethyl)-chloromethylphosphine oxide, bis-(2-p-nitrophenoxyethyl)-chloromethylphosphine oxide and tris-(2-p-nitro-m-chlorophenoxyethyl)-phosphine oxide display biocidal activity. They are able to inhibit growth of bacteria and to kill insects. They are employed in the same manner as previously known bactericides, insecticides and the like which are based on phosphorus compounds.

EXAMPLE 1

To 238 g of an 80 percent aqueous solution of tetrakis-(hydroxymethyl)-phosphonium chloride there are added with cooling 53 g (0.81 mol) of potassium hydroxide in 150 ml of water. While cooling with ice, there are conducted in 140 g (3.2 mols) of ethylene oxide. The pH is maintained between 8 and 9 by addition of HCl (1:1). When the introduction of ethylene oxide is complete, excess ethylene oxide is removed by passing in nitrogen. Then, the mixture is poured into 2 liters of ethyl alcohol, the separated KCl (59 g) is filtered off, the filtrate concentrated by evaporation and the remaining filtrate is dried at 70°C. in a high vacuum. The phosphonium salt having 1 mol of water of crystallization is obtained, confirmed by the nuclear magnetic resonance spectrum:

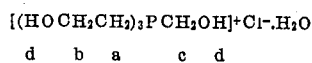

$[(HOCH_2CH_2)_3PCH_2OH]^+Cl^-\cdot H_2O$
  d         b      a     c       d $^1$H–NMR (in $D_2O$ and tetramethylsilane as reference)
a. at 3.18 ($J_{HH}$6.25, $J_{PH}$12.6, found 6.0 H, calc'd 6.0 H)
b. at 4.55 ($J_{HH}$6.25, $J_{PH}$18.5, found 6.45 H, calc'd 6.0 H)
c. at 5.16 ($J_{PH}$1.6, 3.0 H, calc'd 2.0 H)
d. at 5.25 (s, found 6.0 H, calc'd 6.0 H)

To 100 g (0.43 mol) of tris-(hydroxyethyl)-hydroxymethylphosphonium chloride (hydrate) dissolved in 835 ml of water are quickly added 26 g (0.645 mol) of sodium hydroxide dissolved in 1290 ml. of water. Hydrogen evolution is observed. Then, the solution is stirred at room temperature for 4 hours and subsequently concentrated by evaporation under reduced pressure and extracted with ethyl alcohol.

Bis-(hydroxyethyl)-hydroxymethylphosphine oxide is quantitatively obtained as a viscous oil after evaporation of the alcohol.

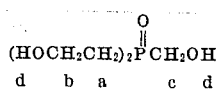

$(HOCH_2CH_2)_2\overset{O}{\underset{\|}{P}}CH_2OH$
   d           b      a    c     d The nuclear magnetic resonance spectrum is found as:
$^1$H–NMR (in $D_2O$ and tetramethyl silane as reference)
a. at 3.15 ($J_{HH}$6.0, $J_{PH}$12.5, found 4.0 H, calc'd 4.0 H)
b. at 4.55 (m, found 4.23 H, calc'd 4.0 H)
c. at 5.10 ($J_{PH}$1.6, found 1.81 H, calc'd 2 H)
d. at 5.28 (s, found 2.96 H, calc'd 3.0 H)

In order to convert to the corresponding chloro compound, 200 g (1.3 mols) of $PC_5$ are gradually added to 72 g of bis-(hydroxyethyl)-hydroxymethylphosphine oxide in 500 ml of carbon tetrachloride. The reaction is exothermic. After refluxing for 3 hours, $CCl_4$ and $POCl_3$ are distilled off, the residue is dissolved in water and neutralized with sodium hydroxide. An oil separates. It is extracted with benzene and after evaporation of the benzene, there are obtained 25 g (26.2 percent) of bis-(chloroethyl)-chloromethylphosphine oxide, melting at 45° to 47°C. after recrystallization at −20°C. in ether, confirmed by NMR spectrum $SOCl_2$, $SO_2Cl_2$ or $PCl_3$ can also be used instead of $PCl_5$. Bromides, iodides or fluorides instead of chlorides are also suitable for the preparation of the corresponding halogen derivatives.

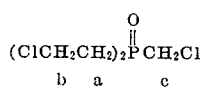

$(ClCH_2CH_2)_2\overset{O}{\underset{\|}{P}}CH_2Cl$
   b        a    c $^1$H–NMR (in $CDCl_3$ and TMS as reference)
a. at 2.52 ($J_{HH}$7; $J_{PH}$11, found 4.0 H, calc'd 4.0 H)
b. at 3.78 ($J_{PH}$7.8)
c. at 3.90 ($J_{HH}$7; $J_{PH}$12.8, b + c found 5.95 H, calc'd 6.0 H)
$^{31}$P–NMR (in $CDCl_3$) – 42.4 ppm.
$C_5H_{10}Cl_3OP$ (223.48) Calc'd % C 26.89 H 4.48 Cl 47.62 P 13.88 Found % C 26.89 H 4.60 Cl 47.51 P 14.07

EXAMPLE 2

A solution of 400 g of $[(HOCH_2CH_2)_3PCH_2OH]^+Cl^-$ dissolved in 2 liters of water is formed and 260 g of chlorine is passed in at 20° C maintaining cooling with ice. The pH is maintained by addition of caustic soda solution at between 3 and 6 during the introduction of chlorine. Then, the pH is adjusted to 7, the mixture evaporated to dryness, the residue taken up in ethyl alcohol, and the sodium chloride filtered off. The solution is passed for purification through an acid $Al_2O_3$ column. After evaporation of the alcohol, there are obtained 278 g (96.4 percent) of $(HOCH_2CH_2)_3PO$ as a colorless viscous oil. The nuclear magnetic resonance spectrum confirms the structure:

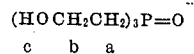

$(HOCH_2CH_2)_3P=O$
    c       b    a $^1$H – NMR (in $CD_3OD$) a. at 2.17 ppm ($J_{HH}$6.5; $J_{PCH}$ 12 Hz, H found 4, calc'd 4.0); b. at 3.9 ppm ($J_{HH}$6.5; $J_{PCH}$6.3 Hz, H found 4.6, calc'd 4.0); c. at 4.9 ppm (H found 3.0 calc'd 3.0). $^{31}$P chemical shift –52.3 ppm.

In order to convert to the corresponding chloro compound, the mixture of 25 g (0.149 mol) of $(HOCH_2CH_2)_3PO$, 99 g of $PCl_5$ (0.476 mol) and 400 ml of $CCl_4$ is refluxed for 2 hours. Then, the carbon tetrachloride is evaporated, ice water is added to the residue and it is extracted with benzene.

Upon evaporation of the benzene, the residue is taken up in ether, filtered or charcoal and cooled down to −20° C. Thereby 5.2 g (16 percent) of white crystals are separated m.p. 89° to 90°C. The $^1$H – NMR spectrum confirms the structure: $(ClCH_2CH_2)_3P=O$ a. at 2.43 ppm (two triplets, $J_{HH}$7.1, $J_{PCH}$ 11.0 Hz, H found 6.0, calc'd 6.0); b. at 3.85 ppm (two triplets, $J_{HH}$7.1; $J_{PCH}$12.5 Hz, H found 6.0, calc'd 6.0) $C_6H_{12}Cl_3OP$(237.5) calc'd % C 30.35 H 5.09 Cl 44.79 found % C 30.39 H 5.14 Cl 44.69

EXAMPLE 3

A solution of 150 g (0.645 mol) of $[(HOCH_2CH_2)_3PCH_2OHcf?CL^-$ in 750 ml of water is adjusted to pH 1. Then, chlorine is led in at 20°C. and the pH maintained at 1 by addition of NaOH. After 6 hours, the mixture is evaporated, the residue dissolved in ethyl alcohol, and the separated NaCl filtered off. After evaporation of the alcohol, the residue is dissolved in water and passed through an ion exchange resin ("DOWEX 50 $Na^+$") in order to remove traces of the starting salt. The aqueous solution is concentrated by evaporation, and extracted with ethyl alcohol for the removal of the sodium chloride formed. After evaporation of the extract there is obtained $(HOCH_2CH_2)_2P(O)CH_2OH$ in almost quantitative yield. The properties conform with those of the compound obtained according to Example 1.

EXAMPLE 4

To 9.5 g (0.139 mol) of sodium ethanolate in 50 ml of ether are added portionwise 10 g (0.0447 mol) of bis-(2-chloroethyl)-chloromethylphosphine oxide. The mixture is refluxed for 1 hour. After addition of water it is neutralized with HCl and evaporated and the residue extracted with ether. The ether extract is distilled to yield 6.6 g (60.8 percent) of bis-(2-ethoxyethyl)-chloromethylphosphine oxide; a colorless liquid, b.p. 115°–120°C/0.005 mm. The structure is confirmed by NMR spectrum:

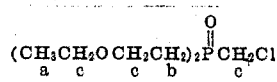

$^1$H-NMR:
a. at 1.19 ($t$, $J_{HH}$7, found 6.08 H, calc'd 6 H)
b. at 2.22 (two $t$, $J_{HH}$6.5; $J_{OCH}$11.3, found 4.04 H, calc'd 4 H)
c. at 3.68 ($m$, found 10.0 H, calc'd 10 H)
$C_9H_{20}ClO_3P$ (242.7) Calc'd % C 44.54 H 8.31 Cl 14.62 Found % C 44.53 H 8.43 Cl 14.45

EXAMPLE 5

To 2.35 g (0.0126 mol) of sodium decanolate in 10 g of 1-decanol there are added 1.4 g (0.0063 mol) of bis-(2-chloroethyl)-chloromethylphosphine oxide dissolved in 25 ml of tetrahydrofuran. After refluxing for 3 hours the solvent is distilled off and the residue is taken up in 100 ml of chloroform. The solution is washed with water, dried with sodium sulfate and concentrated. Upon addition of some light petroleum ether and cooling to −20°C, the mixture crystallizes to yield 2.4 g (84.5%) of bis-(2-decanoxyethyl)-chloromethylphosphine oxide; m.p. 35.5-36°C. $^1$H-NMR confirms the structure.
$C_{25}H_{52}ClO_3P$ (467.1) Calc'd % C 64.28 H 11.22 Cl 7.59
Found % C 65.97 H 11.50 Cl 6.03

EXAMPLE 6

A mixture of 2.2 g (0.011 mol) of bis-(2-chloroethyl)-chloromethylphosphine oxide, 30 ml of tetrahydrofuran and 4 g (0.022 mol) of sodium p-chlorothiophenolate is refluxed for 3 hours. The sodium chloride formed is filtered off, and the tetrahydrofuran distilled to yield 4.1 g (93.5 percent) of bis-(2-p-chlorphenylthioethyl)-chloromethylphosphine oxide; a yellow viscous oil. $^1$H-NMR confirms the structure.
$C_{17}H_{18}Cl_3PS_2$ (439.8) Calc'd % C 46.43 H 4.13 Cl 24.16 S 14.58
Found % C 46.34 H 4.16 Cl 24.05 S 14.74

EXAMPLE 7

Ten g (0.0595 mol) of bis-(2-hydroxyethyl)-hydroxymethylphosphine oxide are heated with 36.2 g (0.355 mol) of acetic acid anhydride at 95°C. for 2 hours. Upon distillation of the acetic acid and excess acetic acid anhydride, the acetoxylated compound remains quantitatively. The residue is distilled, whereby partial decomposition occurs.
Yield: 5.5 g (31.5 percent) of bis-(2-acetoxyethyl)-acetoxymethylphosphine oxide; liquid $n_D^{20}$ 1.4741

$C_{11}H_{19}O_7P$ (294.2) Calc'd % C 44.90 H 6.51 P 10.53 found % C 44.81 H 6.57 P 10.47

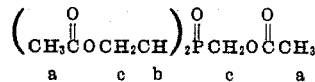

$^1$H-NMR:
a. at 2.05 ppm ($s$)
b. at 2.24 ppm ($J_{HH}$7 cps; $J_{PCH}$11 cps) ($a + b$ found 13 H, calc'd 13 H)
c. at 4.44 ppm ($J_{HH}$7 cps; $J_{PCCH}$ 7 cps, found 6.3 H, calc'd 6 H)

EXAMPLE 8

To 10.8 g (0.059 mol) of tris-(2-hydroxyethyl)-phosphine oxide in 30 ml of nitrobenzene are added 14.7 g (0.183 mol) of acetic acid anhydride. The reaction is strongly exothermic and the temperature rises to 65°C. Then, the mixture is stirred at 70°C. for 2 hours. Upon distillation of the nitrobenzene, the tris-(2-acetoxyethyl)-phosphine oxide is left quantitatively viscous liquid. A small sample is distilled for the analysis, b.p. 155°–156°C/0.005 mm, $n_D^{20}$ 1.4846
$^{31}$P-NMR:
chemical shift −55.2 ppm

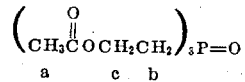

$^1$H-NMR:
a. at 2.03 ppm ($s$)
b. at 2.23 ppm ($a +$ found 15 H, calc'd 15 H)
c. at 4.35 ppm ($m$, found 5.24 H, calc'd 6 H)

EXAMPLE 9

Into 6.2 g of bis-(2-acetoxyethyl)-acetoxymethylphosphine oxide (from Example 7) at a bath temperature of from 130° to 140°C. is bubbled in dry HBr and the formed acetic acid is continuously distilled off. After 8 hours the residue is extracted with ether. Upon cooling 1.5 g of white crystals of bis-(2-bromoethyl)-bromo-methylphosphine oxide are separating; m.p. 88°–97°C, and after recrystallization 98°–99C.

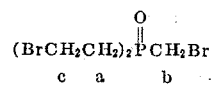

$^1$H-NMR:
a. at 2.65 ppm ($m$, found 4.02 H, calc'd 4 H)
b. at 3.45 ppm ($J_{PCH}$7.8 cps)
c. at 3.75 ppm ($m$, $b + c$ found 5.98, calc'd 6H)

EXAMPLE 10

To 8.9 g (0.129 mol) of sodium ethanolate in 150 ml of ether are added 9.9 g (0.042 mol) of tris-(2-chloroethyl)-phosphine oxide. The reaction is exothermic. Upon refluxing for 1 ½ hour the formed NaCl is filtered off and the remaining is distilled. Yield: 10.4 g (93.7 percent) of tris-(2-ethoxyethyl)-phosphine oxide; b. p. 105°–106°C/0.001 mm, $n_D^{20}$ 1.4591. The nuclear resonance spectrum confirms the structure.

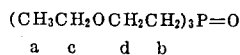

$^1$H-NMR (in CDCl$_3$ and TMS as a reference):
  a. at 1.15 ppm ($t$, $J_{HH}$7 cps, found 8.89 H, calc'd 9.0 H)
  b. at 2.1 ppm (two $t$, $J_{HH}$6.5 cps, $J_{PCH}$12 cps, found 6.01 H, calc'd 6.0 H)
  c. at 3.45 ppm ($q$, $J_{HH}$7 cps, found 6.0 H, calc'd 6.0 H)
  d. at 3.72 ppm (two $t$, $J_{HH}$6.5 cps, $J_{PCH}$14.5 cps, found 6.0 H, calc'd 6.0 H)

$^{31}$P-NMR:
chemical shift (in CHCl$_3$) –39.4 ppm.

What is claimed is:

1. Tertiary phosphine oxide having the general formula

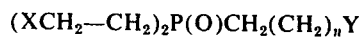

wherein n has a value of 0 or 1; when $n$ is 0, X is hydroxyl, chlorine, bromine, RO—, RS—, or RC(O)O— wherein R is a hydrocarbon group derived from a monohydric alcohol, phenol of mercaptan, and Y is hydroxyl, chlorine or bromine, provided that when X is hydroxyl, Y is not hydroxyl, chlorine or bromine and when Y is hydroxyl, X is not hydroxyl, chlorine, bromine, RO—, RS—, or RC(O)O—; and when $n$ is 1, both X and Y are chlorine, bromine, RO—, RS—, RC(O)O—.

2. Tertiary phosphine oxide of claim 1 which is bis-(2-chloroethyl)-chloromethylphosphine oxide.

3. Tertiary phosphine oxide of claim 1 which is tris-(2-chloroethyl)-phosphine oxide.

4. Tertiary phosphine oxide of claim 1, wherein X and Y signify RO or RS groups wherein R is defined as above and Y is a chlorine atom if N is zero 5. Tertiary phosphine oxide of claim 1, wherein X and Y signify RO or RS groups wherein P is defined as above and Y is a bromine atom if n is zero.

6. Tertiary phosphine oxide of claim 1 which is bis-(2-ethoxyethyl)-chlorometylphosphine oxide.

7. Tertiary phosphine oxide of claim 1 which is bis-(2-decanoxyethyl)-chloromethylphsphine oxide.

8. Tertiary phosphine oxide of claim 1 which is bis-(2-p-chlorophenylthioethyl)-chloromethylphosphine oxide.

9. Tertiary phosphine oxide of claim 1 which is bis-(2-bromoethyl)-bromomethylphosphine oxide.

10. Tertiary phosphine oxide of claim 1 which is tris-(2-ethoxyethyl)-phosphine oxide.

11. Tertiary phosphine oxide of claim 1 which is bis-(2-acetoxyethyl)-acetoxymethylphosphine oxide.

12. Tertiary phosphine oxide of claim 1 which is tris-(2-acetoxyethyl)-phosphine oxide.

13. Tertiary phosphine oxide of claim 1 wherein $n$ is 1 and X and Y are bromine.

* * * * *